US012623606B1

(12) United States Patent
Zhang et al.

(10) Patent No.: US 12,623,606 B1
(45) Date of Patent: May 12, 2026

(54) LINKAGE MECHANISM, PEDAL APPARATUS, AND VEHICLE

(71) Applicant: ZHONGSHAN AOD ELECTRONICS TECHNOLOGY CO., LTD., Zhongshan (CN)

(72) Inventors: Jingyu Zhang, Zhongshan (CN); Xiangliang Meng, Zhongshan (CN); Xuanmo Guo, Zhongshan (CN)

(73) Assignee: Zhongshan AOD Electronics Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/301,611

(22) Filed: Aug. 15, 2025

(30) Foreign Application Priority Data

Jun. 25, 2025  (CN) .......................... 202510854756.0

(51) Int. Cl.
B60R 3/02 (2006.01)

(52) U.S. Cl.
CPC ..................................... B60R 3/02 (2013.01)

(58) Field of Classification Search
CPC ....................................................... B60R 3/02
See application file for complete search history.

(56) References Cited

U.S. PATENT DOCUMENTS 4,110,673 A * 8/1978 Nagy ................... H02H 7/0851
                                                            280/166
7,441,790 B2 * 10/2008 Lechkun ................... B60R 3/02
                                                            280/166

FOREIGN PATENT DOCUMENTS

| CN | 114407785 A | 4/2022 |
|----|-------------|--------|
| CN | 114619966 A | 6/2022 |
| CN | 216761626 U | 6/2022 |
| CN | 216761627 U | 6/2022 |
| CN | 216915698 U | 7/2022 |

* cited by examiner

*Primary Examiner* — Bryan A Evans
(74) *Attorney, Agent, or Firm* — Ming Jiang; OPENPTO US LLC

(57) ABSTRACT

A linkage mechanism, a pedal apparatus, and a vehicle are disclosed. The linkage mechanism comprises a mounting base, a telescopic base located below the mounting base, a first swing arm and a second swing arm pivotally connecting the bases, a flipping arm pivotally connected to the telescopic base, and at least one linkage assembly. The linkage assembly is arranged on at least one side of the telescopic base and is pivotally connected to the flipping arm to drive its rotation. This configuration enables the linkage mechanism to provide both extension and flipping functions. Advantageously, when the pedal apparatus is in a retracted state, the design increases the vehicle's ground clearance, thereby enhancing its passability and off-road performance.

17 Claims, 6 Drawing Sheets

LINKAGE MECHANISM, PEDAL APPARATUS, AND VEHICLE

TECHNICAL FIELD

The present application relates to the field of automobile accessories, and in particular, to a linkage mechanism, a pedal apparatus, and a vehicle.

BACKGROUND

For new energy sport utility vehicles (SUVs), the battery pack mounted on the chassis is relatively close to the side beams of the vehicle, which severely restricts the installation space for an electric pedal apparatus. A retractable and flipping type electric pedal apparatus offers broad application prospects for new energy SUVs because it can provide both sufficient extension length and retracted concealment.

SUMMARY

In a first aspect, a technical solution adopted by the present application is to provide a linkage mechanism for use in a pedal apparatus. The linkage mechanism comprises:
   a mounting base, for being fixed to a vehicle;
   a telescopic base, wherein, in a first direction, the telescopic base is located below the mounting base;
   a first swing arm, wherein one end of the first swing arm is pivotally connected to the mounting base at a first pivot point, and the other end of the first swing arm is pivotally connected to the telescopic base at a second pivot point;
   a second swing arm, wherein one end of the second swing arm is pivotally connected to the mounting base at a third pivot point, and the other end of the second swing arm is pivotally connected to the telescopic base at a fourth pivot point; wherein, in a second direction, at least one of the first swing arm and the second swing arm is capable of driving the telescopic base to extend and retract relative to the mounting base;
   a flipping arm, wherein the flipping arm is pivotally connected to the telescopic base at a fifth pivot point;
   at least one linkage assembly, wherein, in a third direction, the linkage assembly is arranged on at least one of two sides of the telescopic base, and the linkage assembly is pivotally connected to the flipping arm at a sixth pivot point; wherein the linkage assembly is capable of driving the flipping arm to pivot about the fifth pivot point via the sixth pivot point.

In a second aspect, another technical solution adopted by the present application is to provide a pedal apparatus for use in a vehicle. The pedal apparatus comprises at least one linkage mechanism, a drive unit, and a pedal body;
   the drive unit is used for driving the at least one linkage mechanism;
   the pedal body is fixed to the at least one linkage mechanism;
   under the drive of the drive unit, the pedal body is capable of extending, retracting, and flipping relative to the vehicle;
   wherein the linkage mechanism is the linkage mechanism described in the first aspect.

In a third aspect, yet another technical solution adopted by the present application is to provide a vehicle, wherein the vehicle comprises the pedal apparatus described in the second aspect.

BRIEF DESCRIPTION OF THE DRAWINGS

To more clearly illustrate the technical solutions in the embodiments of the present application, the accompanying drawings required for the description of the embodiments will be briefly introduced below. It is apparent that the drawings in the following description are only some embodiments of the present application, and other drawings can be obtained by those of ordinary skill in the art based on these drawings without creative effort.

REFERENCE NUMERALS

Figure 1:
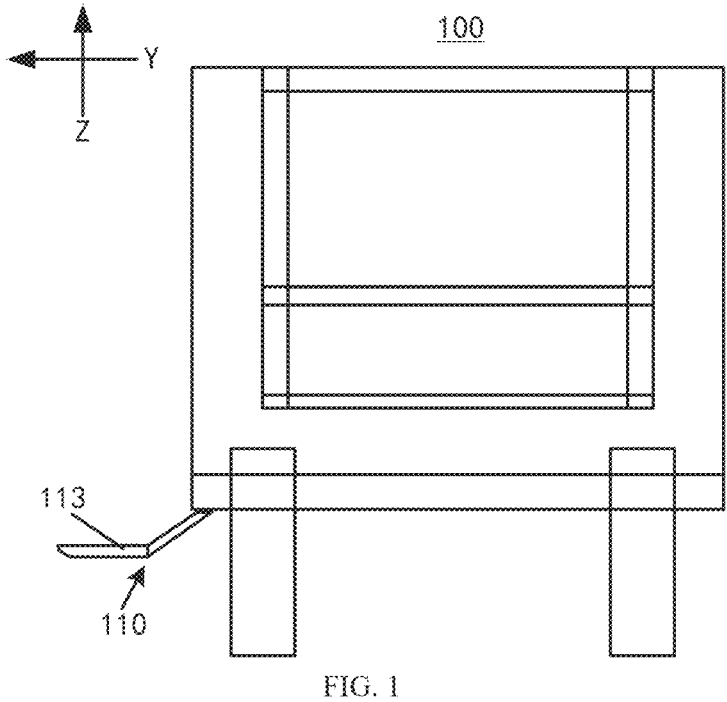
FIG. 1 is a schematic structural diagram of a vehicle with a pedal apparatus in an extended state, according to some embodiments of the present application.

100: vehicle
110: pedal apparatus
111: linkage mechanism
H: overall height
112: drive unit
113: pedal body
1111: mounting base
1112: telescopic base
1113: first swing arm
1114: second swing arm
1114$a$: connecting shaft
1115: flipping arm
1116: linkage assembly
1116$a$: first link
1116$b$: second link
D1: first pivot point
D2: second pivot point
D3: third pivot point
D4: fourth pivot point
D5: fifth pivot point
D6: sixth pivot point
D7: seventh pivot point
D8: eighth pivot point α: first angle β: second angle.

DETAILED DESCRIPTION

The technical solutions in the embodiments of the present application will be described clearly and completely below with reference to the accompanying drawings. It is to be understood that the specific embodiments described herein are merely for explaining the present application and not for limiting it. It should also be noted that, for the convenience of description, the drawings only show parts related to the present application and not the entire structure. All other embodiments obtained by a person of ordinary skill in the art based on the embodiments in the present application without making creative efforts shall fall within the protection scope of the present application.

The terms "first," "second," and "third" in this application are used for descriptive purposes only and are not to be construed as indicating or implying relative importance or implicitly indicating the number of technical features indicated. Thus, a feature defined with "first," "second," or "third" may explicitly or implicitly include at least one such feature. In the description of the present application, "a plurality of" means at least two, such as two, three, etc., unless otherwise specified. All directional indicators (such as up, down, left, right, front, rear, etc.) in the embodiments of the present application are only used to explain the relative positional relationships, motion, etc., between components in a certain posture (as shown in the drawings). If this specific posture changes, the directional indicators will also change accordingly. Furthermore, the terms "comprising" and "having," as well as any variations thereof, are intended to cover non-exclusive inclusion. For example, a process, method, system, product, or apparatus that comprises a series of steps or units is not limited to the listed steps or units, but optionally also includes steps or units not listed, or optionally also includes other steps or units inherent to such a process, method, product, or apparatus.

Reference herein to "an embodiment" means that a particular feature, structure, or characteristic described in connection with the embodiment can be included in at least one embodiment of the present application. The appearances of the phrase in various places in the specification are not necessarily all referring to the same embodiment, nor are they separate or alternative embodiments mutually exclusive of other embodiments. It is understood, both explicitly and implicitly, by those skilled in the art that the embodiments described herein may be combined with other embodiments.

In the present application, the first direction refers to the direction of the Z-axis, the second direction refers to the direction of the Y-axis, and the third direction refers to the direction of the X-axis. "Upward" refers to the direction indicated by the positive direction of the Z-axis, "downward" refers to the direction indicated by the negative direction of the Z-axis, "outward" refers to the direction indicated by the positive direction of the Y-axis, "inward" refers to the direction indicated by the negative direction of the Y-axis, "right" refers to the direction indicated by the positive direction of the X-axis, and "left" refers to the direction indicated by the negative direction of the X-axis.

In the present application, when the linkage mechanism 111 is in an extended state, the pedal apparatus 110 is in an extended state. When the linkage mechanism 111 is in a retracted state, the pedal apparatus 110 is in a retracted state. When the telescopic base 1112 is in a retracted position and the flipping arm 1115 is at a first flipping limit position, the linkage mechanism 111 is in the retracted state. When the telescopic base 1112 is in an extended position and the flipping arm 1115 is at a second flipping limit position, the linkage mechanism 111 is in the extended state.

The linkage mechanism provided by the present application comprises: a mounting base for being fixed to a vehicle; a telescopic base, wherein, in a first direction, the telescopic base is located below the mounting base; a first swing arm, wherein one end of the first swing arm is pivotally connected to the mounting base at a first pivot point, and the other end of the first swing arm is pivotally connected to the telescopic base at a second pivot point;

a second swing arm, wherein one end of the second swing arm is pivotally connected to the mounting base at a third pivot point, and the other end of the second swing arm is pivotally connected to the telescopic base at a fourth pivot point; wherein, in a second direction, at least one of the first swing arm and the second swing arm is capable of driving the telescopic base to extend and retract relative to the mounting base; a flipping arm, wherein the flipping arm is pivotally connected to the telescopic base at a fifth pivot point; and at least one linkage assembly, wherein, in a third direction, the linkage assembly is arranged on at least one of two sides of the telescopic base, and the linkage assembly is pivotally connected to the flipping arm at a sixth pivot point; wherein the linkage assembly is capable of driving the flipping arm to pivot about the fifth pivot point via the sixth pivot point. In the technical solution of the present application, during the process where the telescopic base extends relative to the mounting base, as the flipping arm extends with the telescopic base, the linkage assembly drives the flipping arm to flip outward, so that the pedal body fixed to the flipping arm has a sufficient extension length. During the process where the telescopic base retracts relative to the mounting base, as the flipping arm retracts with the telescopic base, the linkage assembly drives the flipping arm to flip inward, so that the pedal body fixed to the flipping arm can fit closely against the vehicle skirt. Because the linkage assembly is arranged on at least one of the two sides of the telescopic base, when the telescopic base is in the retracted state, the overall height of the linkage mechanism in the first direction can be designed to be smaller, thereby improving the passability and off-road performance of the vehicle. In this way, the linkage mechanism, while satisfying the functions of extension, retraction, and flipping, can increase the ground clearance of the vehicle chassis in the retracted state, thereby improving the passability and off-road performance of the vehicle.

Figure 2:
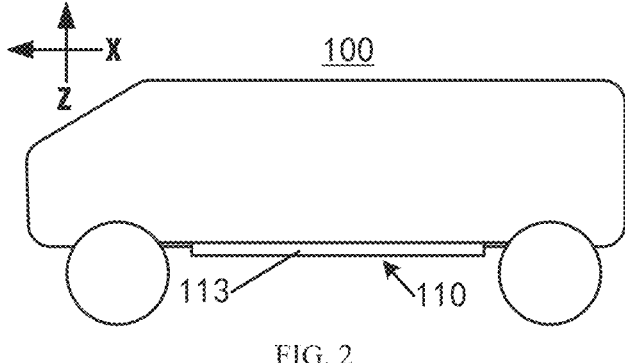
FIG. 2 is a schematic structural diagram of a vehicle with a pedal apparatus in a retracted state, according to some embodiments of the present application.

Please refer to FIG. 1 and FIG. 2. FIG. 1 is a schematic structural diagram of a vehicle with a pedal apparatus in an extended state, according to some embodiments of the present application; FIG. 2 is a schematic structural diagram of the vehicle with a pedal apparatus in a retracted state, according to some embodiments of the present application. The vehicle 100 provided by the present application may include, but is not limited to, a pedal apparatus 110. When the pedal apparatus 110 is in an extended state, a first gap distance exists in the first direction between the pedal body 113 of the pedal apparatus 110 and the side skirt of the vehicle 100, and a second gap distance exists in the second direction between the pedal body 113 of the pedal apparatus 110 and the side skirt of the vehicle 100, so as to form a step structure, thereby reducing the ground clearance of the vehicle 100 and facilitating users to get on and off the vehicle. When the pedal apparatus 110 is in the retracted state, the pedal body 113 of the pedal apparatus 110 fits closely against the side skirt of the vehicle 100, so as not to affect the passability of the vehicle 100 while maintaining a clean and streamlined appearance of the vehicle 100.

Wherein, the first gap distance is greater than or equal to 100 mm and less than or equal to 200 mm, so that the occupant has a sufficient foothold when stepping on the pedal body 113 of the pedal apparatus 110, thereby improving users' comfort and satisfaction. Specifically, the size of the first gap distance can be 100 mm, 120 mm, 125 mm, 130 mm, 150 mm, 160 mm, 175 mm, or 200 mm, etc. In this example, the first gap distance is approximately 126 mm. The second gap distance is greater than or equal to 100 mm and less than or equal to 150 mm, so that when the pedal apparatus 110 is in the extended state, it can effectively reduce the ground clearance of the vehicle 100, thereby facilitating entry and exit for different users and improving friendliness to shorter users. Specifically, the size of the second gap distance can be 100 mm, 105 mm, 110 mm, 120 mm, 125 mm, 130 mm, 140 mm, or 150 mm, etc. In this example, the second gap distance is approximately 137 mm.

Figure 3:
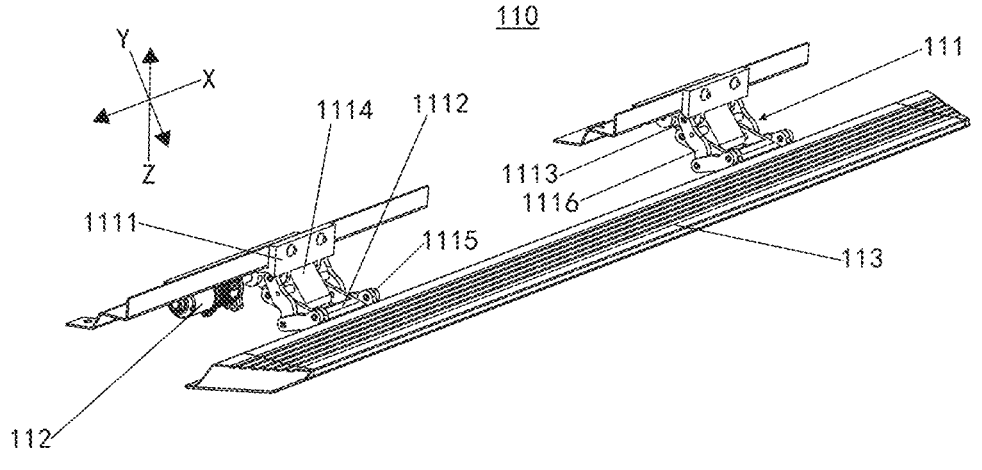
FIG. 3 is a schematic structural diagram of a pedal apparatus in an extended state, according to some embodiments of the present application.
Figure 4:
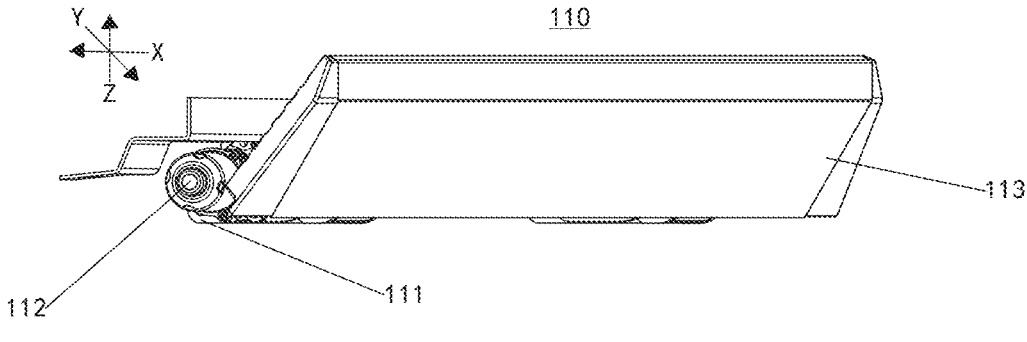
FIG. 4 is a schematic structural diagram of a pedal apparatus in a retracted state, according to some embodiments of the present application.

Please refer to FIG. 1 to FIG. 4. FIG. 3 is a schematic structural diagram of a pedal apparatus in an extended state, according to some embodiments of the present application; FIG. 4 is a schematic structural diagram of a pedal apparatus in a retracted state, according to some embodiments of the present application. The pedal apparatus 110 provided by the present application may include, but is not limited to, a linkage mechanism 111, a drive unit 112, and a pedal body 113. Specifically, the drive unit 112 is used to drive the first swing arm 1113 and/or the second swing arm 1114 in the linkage mechanism 111. The pedal body 113 is fixed to the flipping arm 1115 in the linkage mechanism 111. Wherein, under the drive of the drive unit 112, the pedal body 113 is capable of extending, retracting, and flipping relative to the mounting base 1111 in the linkage mechanism 111.

Further, the pedal apparatus 110 includes a plurality of linkage mechanisms 111. The plurality of linkage mechanisms 111 are arranged along the length of the pedal body 113. The drive unit 112 is drivingly connected to one of the plurality of linkage mechanisms 111. In this embodiment, the pedal apparatus 110 includes two linkage mechanisms 111, arranged along the length of the pedal body 113, and the pedal apparatus 110 is installed on both sides of the vehicle 100. In some other embodiments, increasing the number of linkage mechanisms 111, for example to three or more, can effectively improve the load-bearing capacity of the pedal apparatus 110 and enhance the stability of its movement. In other embodiments, the pedal apparatus 110 includes one linkage mechanism 111, arranged at a middle position along the length of the pedal body 113. The pedal apparatus 110 is installed at positions corresponding to the vehicle doors, such as the tailgate, front left door, front right door, rear left door, and rear right door, etc.

Further, when the mounting base 1111 of the linkage mechanism 111 is fixed to the chassis of the vehicle 100, if the telescopic base 1112 of the linkage mechanism 111 is in the extended position, the angle between the stepping surface of the pedal body 113 and a horizontal plane is greater than or equal to 0° and less than or equal to 5°, to prevent the user from easily slipping outward when stepping on the stepping surface. Specifically, the angle between the stepping surface of the pedal body 113 and the horizontal plane can be 0°, 1°, 1.7°, 2°, 2.5°, 3°, 3.7°, 4°, 4.5°, or 5°, etc. In this embodiment, when the telescopic base 1112 is in the extended position, the angle between the stepping surface of the pedal body 113 and the horizontal plane is approximately 1.57°. If the telescopic base 1112 of the linkage mechanism 111 is in the retracted position, the angle between the stepping surface of the pedal body 113 and the horizontal plane is greater than or equal to 20° and less than or equal to 75°, in order to better fit the vehicle skirt, improve retracted concealment, overall aesthetics, and passability, while also adapting to more vehicle models. Specifically, the angle between the stepping surface of the pedal body 113 and the horizontal plane can be 20°, 23°, 25°, 27.5°, 28°, 30°, 33°, 35°, 37.5°, 40°, 45°, 47°, 50°, 52°, 55°, 57°, 60°, 62°, 65°, 67°, 70°, 72°, 73°, 74°, or 75°, etc. In this embodiment, when the telescopic base 1112 is in the retracted position, the angle between the stepping surface of the pedal body 113 and the horizontal plane is approximately 60°.

Optionally, the drive unit 112 can be an electric motor. In this embodiment, the drive unit 112 is in transmission connection with the first swing arm 1113 to drive the first swing arm 1113, thereby driving the telescopic base 1112 to extend or retract relative to the mounting base 1111 with the assistance of the second swing arm 1114. In this embodiment, when the pedal apparatus 110 is in the extended state, the stepping load borne by the pedal body 113 is difficult to transmit to the drive unit 112, thus protecting the drive unit 112.

Figure 5:
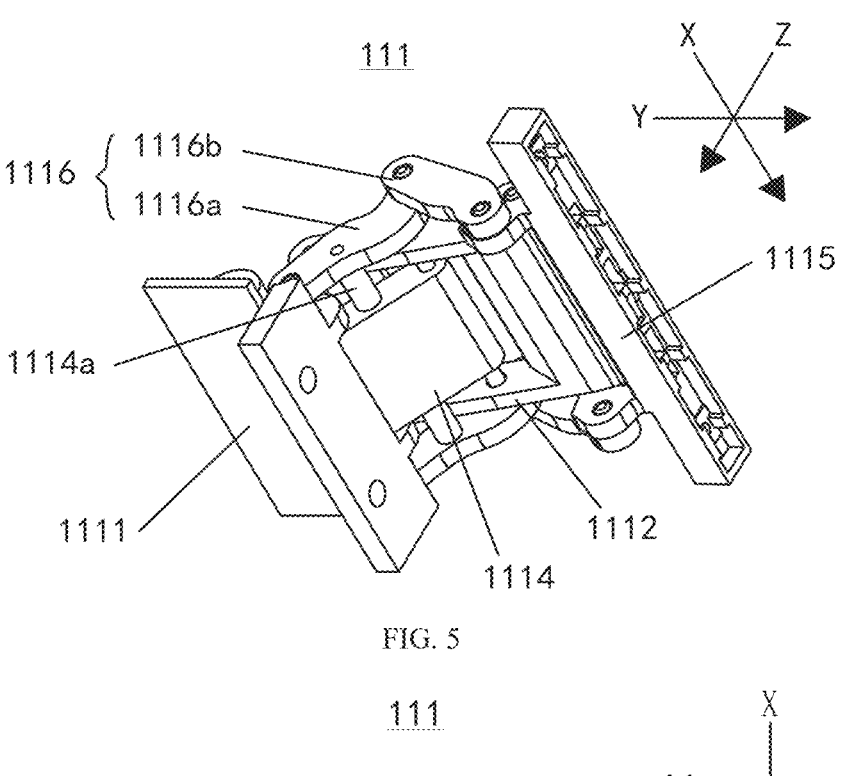
FIG. 5 is a schematic structural diagram of a linkage mechanism in an extended state, according to some embodiments of the present application.
Figure 6:
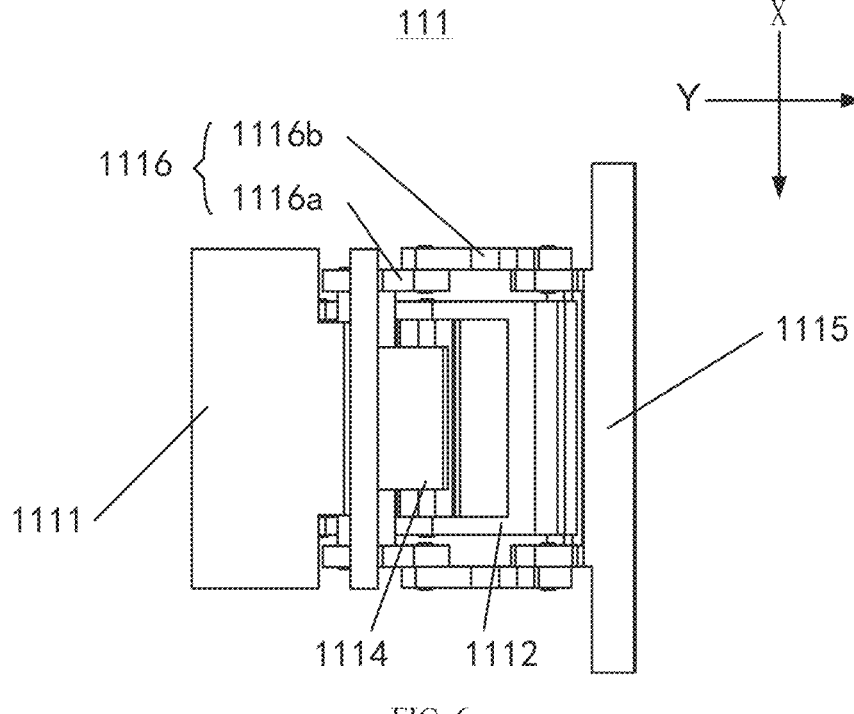
FIG. 6 is a schematic planar projection view of the linkage mechanism of FIG. 5 from one perspective.
Figure 7:
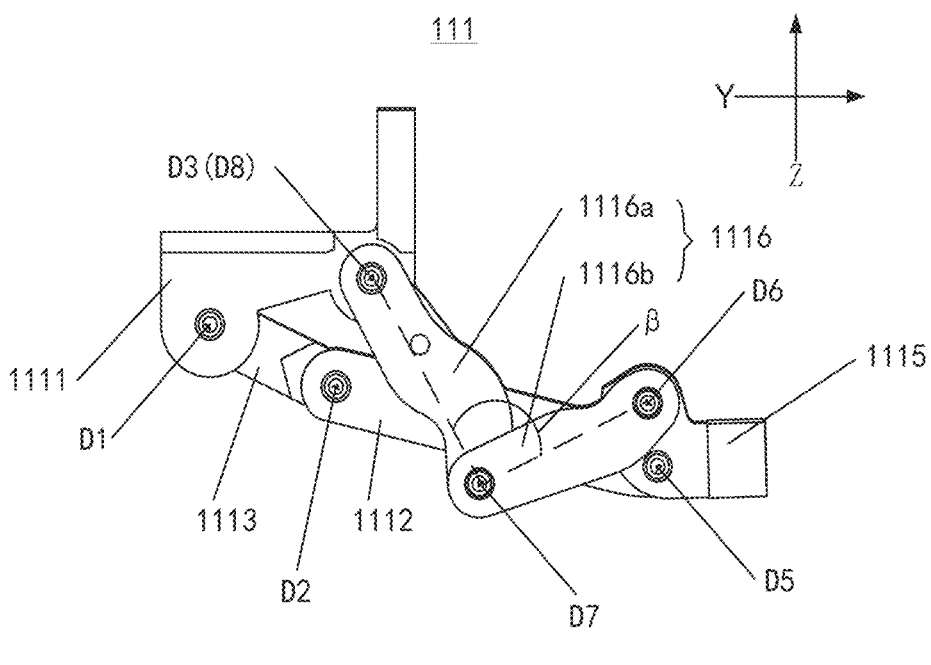
FIG. 7 is a schematic planar projection view of the linkage mechanism of FIG. 5 from another perspective.
Figure 8:
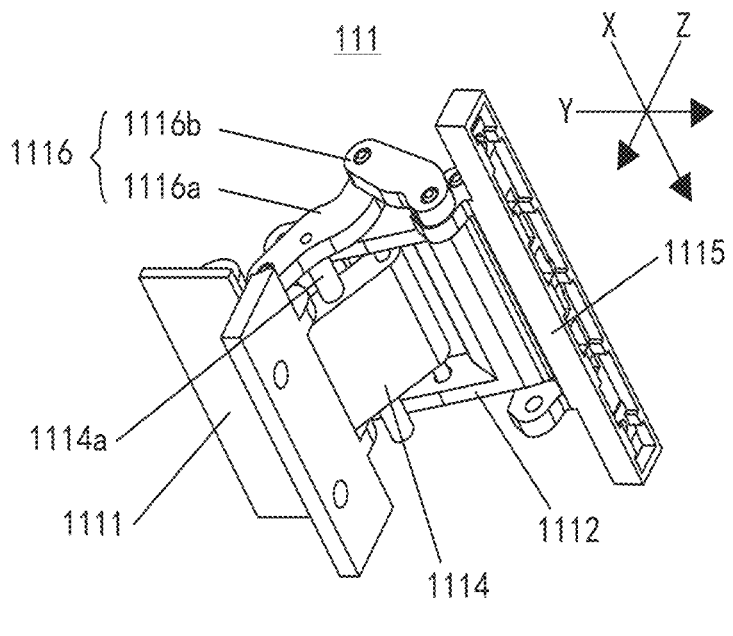
FIG. 8 is a schematic structural diagram of a linkage mechanism in an extended state, according to other embodiments of the present application.
Figure 9:
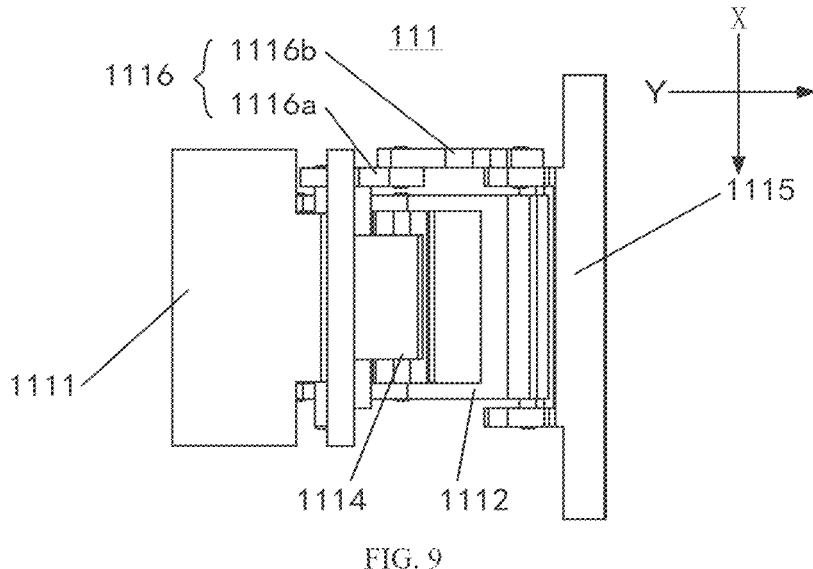
FIG. 9 is a schematic planar projection view of the linkage mechanism of FIG. 8 from one perspective.
Figure 10:
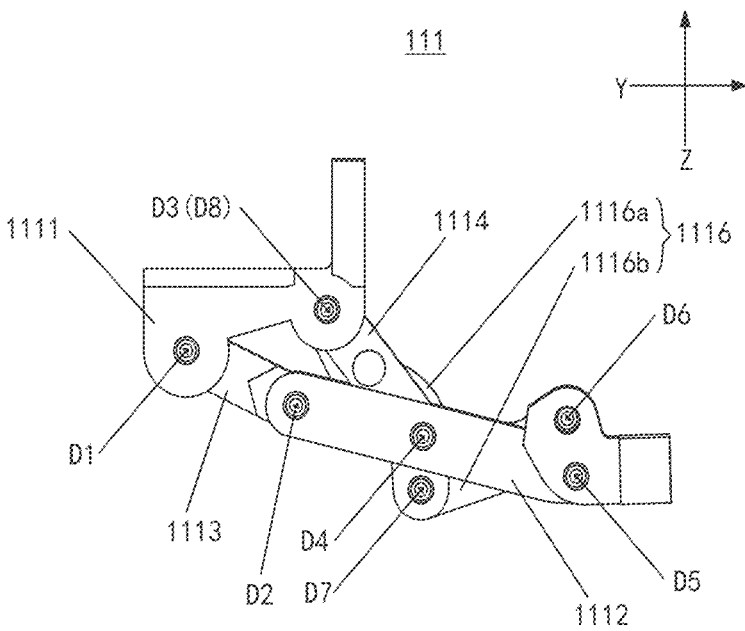
FIG. 10 is a schematic planar projection view of the linkage mechanism of FIG. 8 from another perspective.
Figure 11:
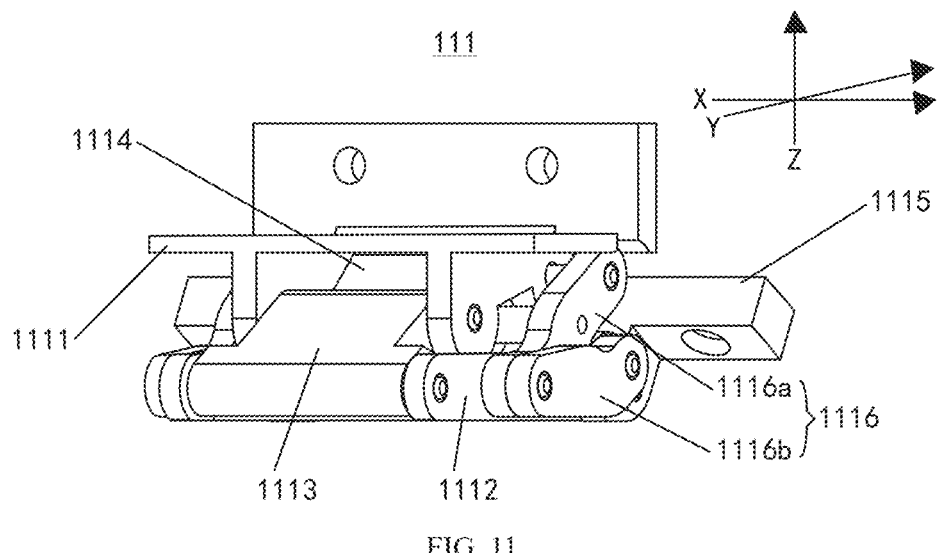
FIG. 11 is a schematic structural diagram of a linkage mechanism in a retracted state, according to some embodiments of the present application.
Figure 12:
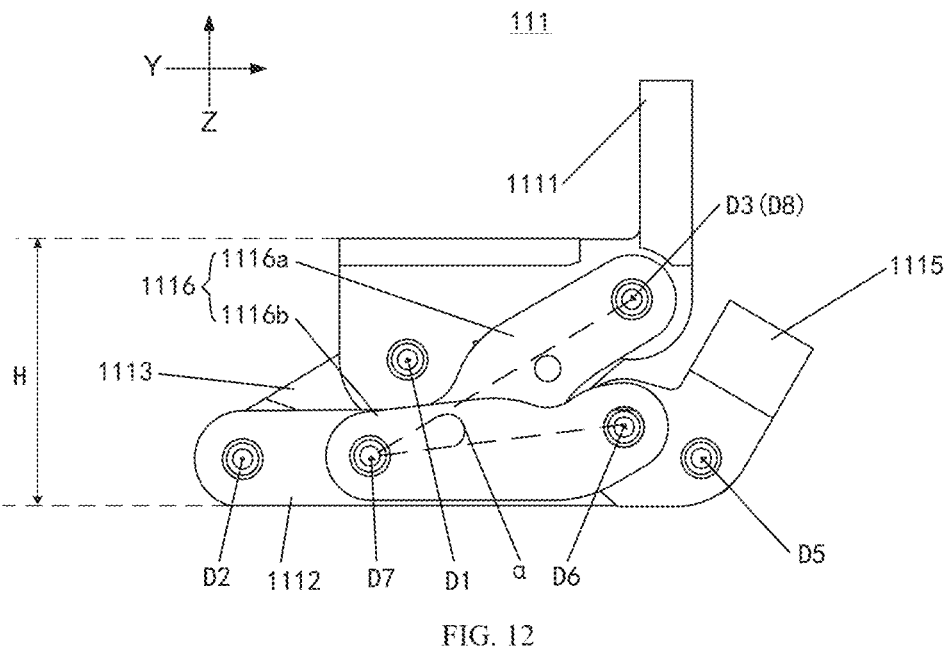
FIG. 12 is a schematic planar projection view of the linkage mechanism of FIG. 11 from one perspective.

Please refer to FIG. 1 to FIG. 12. FIG. 5 is a schematic structural diagram of a linkage mechanism in an extended state, according to some embodiments of the present application; FIG. 6 is a schematic planar view of the linkage mechanism of FIG. 5 from one perspective; FIG. 7 is a schematic planar view of the linkage mechanism of FIG. 5 from another perspective; FIG. 8 is a schematic structural diagram of a linkage mechanism in an extended state, according to other embodiments of the present application; FIG. 9 is a schematic planar view of the linkage mechanism of FIG. 8 from one perspective; FIG. 10 is a schematic planar view of the linkage mechanism of FIG. 8 from another perspective; FIG. 11 is a schematic structural diagram of a linkage mechanism in a retracted state, according to some embodiments of the present application; FIG. 12 is a schematic planar view of the linkage mechanism of FIG. 11 from one perspective. The linkage mechanism 111 provided by the present application may include, but is not limited to, a mounting base 1111, a telescopic base 1112, a first swing arm 1113, a second swing arm 1114, a flipping arm 1115, and at least one linkage assembly 1116. The mounting base 1111 is for being fixed to the vehicle 100. In the first direction, the telescopic base 1112 is located below the mounting base 1111. In this embodiment, the first swing arm 1113 and the second swing arm 1114 can be attached to the chassis of the vehicle 100 via the mounting base 1111, allowing the pedal apparatus 110 to be installed as a separate add-on accessory. The mounting base 1111 can also be attached to the chassis of the vehicle 100 via a sheet metal part for better adaptation to installation on the chassis of the vehicle 100. In other embodiments, the first swing arm 1113 and the second swing arm 1114 can be directly attached to the chassis of the vehicle 100. One end of the first swing arm 1113 is pivotally connected to the mounting base 1111 at a first pivot point D1. The other end of the first swing arm 1113 is pivotally connected to the telescopic base 1112 at a second pivot point D2. One end of the second swing arm 1114 is pivotally connected to the mounting base 1111 at a third pivot point D3. The other end of the second swing arm 1114 is pivotally connected to the telescopic base 1112 at a fourth pivot point D4. In the second direction, at least one of the first swing arm 1113 and the second swing arm 1114 is capable of driving the telescopic base 1112 to extend and retract relative to the mounting base 1111. In this embodiment, the telescopic base 1112 is driven to extend and retract relative to the mounting base 1111 by the first swing arm 1113. The flipping arm 1115 is pivotally connected to the telescopic base 1112 at a fifth pivot point D5. In the second direction, the fourth pivot point D4 is located between the fifth pivot point D5 and the second pivot point D2. In the third direction, the linkage assembly 1116 is arranged on at least one of the two sides of the telescopic base 1112, such that when the linkage mechanism 111 is in the retracted state, the overall height H of the linkage mechanism 111 in the first direction is smaller, which is beneficial for increasing the ground clearance of the chassis of the vehicle 100, thereby improving the passability and off-road performance of the vehicle 100. The at least one linkage assembly 1116 is in transmission connection with the second swing arm 1114, such that the second swing arm 1114 can drive the linkage assembly 1116. One end of the linkage assembly 1116 is pivotally connected to the mounting base 1111, and the other end of the linkage assembly 1116 is pivotally connected to the flipping arm 1115 at a sixth pivot point D6. In the second direction, the sixth pivot point D6 is closer to the second pivot point D2 relative to the fifth pivot point D5, enabling the linkage assembly 1116 to drive the flipping arm 1115 to pivot about the fifth pivot point D5 via the sixth pivot point D6.

Wherein, under the drive of the linkage assembly 1116, the angular range in which the flipping arm 1115 can pivot about the fifth pivot point D5 can be greater than or equal to 45° and less than or equal to 70°, so that the pedal apparatus 110 can be adapted to as many vehicle models as possible. Further, under the drive of the linkage assembly 1116, the angular range in which the flipping arm 1115 can pivot about the fifth pivot point D5 can be greater than or equal to 55° and less than or equal to 62°. Specifically, the angle that the flipping arm 1115 can pivot about the fifth pivot point D5 can be 45°, 46°, 47°, 49°, 51°, 52°, 53°, 54°, 55°, 56°, 56.5°, 57°, 58°, 58.5°, 59°, 60°, 61°, 62°, 64°, 66°, 68°, or 70°, etc. In this embodiment, when the flipping arm 1115 moves from the first flipping limit position to the second flipping limit position or from the second flipping limit position to the first flipping limit position, the angle that the flipping arm 1115 pivots about the fifth pivot point D5 is approximately 58.5°.

In this embodiment, when the telescopic base 1112 is in the retracted position, the overall height H of the linkage mechanism 111 in the first direction can be greater than 0 mm and less than 70 mm, so that when the pedal apparatus 110 installed on the vehicle 100 is in the retracted state, the vehicle 100 still has an appropriate ground clearance, thereby improving the passability and off-road performance of the vehicle 100. Further, when the telescopic base 1112 is in the retracted position, the overall height H of the linkage mechanism 111 in the first direction can be greater than 63 mm and less than 69 mm. Specifically, the overall height H of the linkage mechanism 111 can be 55 mm, 56 mm, 57 mm, 58 mm, 60 mm, 62 mm, 64 mm, 65 mm, 66 mm, 67 mm, 68 mm, or 69 mm, etc. In this embodiment, the overall height H of the linkage mechanism 111 is approximately 66 mm.

In this embodiment, there are two linkage assemblies 1116. In the third direction, one linkage assembly is located on the right side of the telescopic base 1112, and the other linkage assembly 1116 is located on the left side of the telescopic base 1112. This allows the force at the support points to be dispersed and more evenly distributed when the linkage assemblies 1116 drive the flipping arm 1115 to pivot about the fifth pivot point D5, while also making the flipping motion more coordinated, thereby improving the load-bearing capacity and service life of the linkage mechanism 111, and avoiding abnormal noise caused by aggravated wear, which would affect comfort.

In this embodiment, one end of the linkage assembly 1116 is pivotally connected to the mounting base 1111 at the third pivot point D3, so that the pivotal connection of the linkage assembly 1116 to the mounting base 1111 and the pivotal connection of the second swing arm 1114 to the mounting base 1111 can share a common pivot shaft, thereby simplifying the structural design, reducing the number of parts, and lowering costs.

In this embodiment, while at least one of the first swing arm 1113 and the second swing arm 1114 drives the telescopic base 1112 to extend or retract relative to the mounting base 1111, the linkage assembly 1116 drives the flipping arm 1115 to pivot about the fifth pivot point D5 away from or towards the mounting base 1111.

Specifically, in the second direction, the sixth pivot point D6 is closer to the second pivot point D2 relative to the fifth pivot point D5. In the first direction, the sixth pivot point D6 is located above the fifth pivot point D5. With this layout, the flipping arm 1115 can be driven by the linkage assembly 1116 to pivot about the fifth pivot point D5 during the process of extending or retracting with the telescopic base 1112. More specifically, during the extension process of the telescopic base 1112, the linkage assembly 1116 drives the flipping arm 1115 to flip outward about the fifth pivot point D5; during the retraction process of the telescopic base 1112, the linkage assembly 1116 drives the flipping arm 1115 to flip inward about the fifth pivot point D5.

Further, the angle that the flipping arm 1115 can pivot about the fifth pivot point D5 is greater than or equal to 20° and less than 59°, so that the pedal body 113 fits closely against the vehicle skirt and can be adapted to more vehicle models. Specifically, the angle that the flipping arm 1115 can pivot about the fifth pivot point D5 can be 20°, 25°, 30°, 35°, 40°, 45°, 50°, 55°, 56°, 57°, 58°, or 58.4°, etc. In this embodiment, the angle that the flipping arm 1115 can pivot about the fifth pivot point D5 is approximately 58.4°.

Further, the distance between the first pivot point D1 and the second pivot point D2 is a first center distance. The distance between the third pivot point D3 and the fourth pivot point D4 is a second center distance. The distance between the first pivot point D1 and the third pivot point D3 is a third center distance. The distance between the second pivot point D2 and the fourth pivot point D4 is a fourth center distance. Wherein, the first center distance is less than the second center distance and the fourth center distance is less than the third center distance, so that when the first swing arm 1113 drives the telescopic base 1112 to the retracted position, it occupies less space under the chassis of the vehicle 100. The difference between the second center distance and the first center distance is greater than or equal to 9 mm and less than or equal to 15 mm. And the difference between the third center distance and the fourth center distance is greater than or equal to 3 mm and less than or equal to 9 mm. In this way, the telescopic base 1112 has a certain swing amplitude and a relatively smooth arc-shaped trajectory, so that the telescopic base 1112 can both extend smoothly from the chassis and not easily collide with protrusions on the ground due to excessive swing amplitude. Specifically, the difference between the second center distance and the first center distance can be 6 mm, 7 mm, 8 mm, 9 mm, 10 mm, 11 mm, or 12 mm, etc. The difference between the third center distance and the fourth center distance can be 3 mm, 4 mm, 5 mm, 6 mm, 7 mm, 8 mm, or 9 mm, etc. In this embodiment, the difference between the second center distance and the first center distance is approximately 12 mm. The difference between the third center distance and the fourth center distance is approximately 6 mm.

Further, the linkage assembly 1116 may include, but is not limited to, a first link 1116a and a second link 1116b. One end of the first link 1116a is pivotally connected to one end of the second link 1116b at a seventh pivot point D7. The other end of the first link 1116a is pivotally connected to the mounting base 1111 at an eighth pivot point D8. The other end of the second link 1116b is pivotally connected to the flipping arm 1115 at the sixth pivot point D6.

In this embodiment, the at least one linkage assembly 1116 is in transmission connection with the second swing arm 1114. Specifically, the second swing arm 1114 is provided with a connecting shaft 1114a. The second swing arm 1114 is fixedly connected to a structure between the two ends of the first link 1116a via the connecting shaft 1114a, so as to drive the linkage assembly 1116.

Wherein, when the telescopic base 1112 is in the retracted position and the flipping arm is at the first flipping limit position, a line connecting the eighth pivot point D8 and the seventh pivot point D7 and a line connecting the sixth pivot point D6 and the seventh pivot point D7 form a first angle α. The first angle α is greater than or equal to 0° and less than 45°. By making the eighth pivot point D8, the seventh pivot point D7, and the sixth pivot point D6 lie on the same straight line or approximately on the same straight line, it is possible to prevent the inertial load acting on the flipping arm 1115 during the travel of the vehicle 100 from causing the telescopic base 1112 to automatically extend, or from being transmitted to the drive unit 112. This can increase the stability of the pedal apparatus 110 in the retracted state. Further, the first angle α can be greater than or equal to 21° and less than 27°.

Specifically, the size of the first angle α can be 0°, 1°, 2°, 3°, 5°, 7.5°, 10°, 12.5°, 15°, 20°, 21°, 23°, 23.5°, 24°, 24.5°, 25°, 27°, 27.5°, 30°, 32°, 35°, 37.5°, 40°, 41°, 42°, 43°, or 44°, etc. In this embodiment, the size of the first angle α is approximately 24°.

Wherein, when the telescopic base 1112 is in the extended position and the flipping arm 1115 is at the second flipping limit position, a line connecting the eighth pivot point D8 and the seventh pivot point D7 and a line connecting the sixth pivot point D6 and the seventh pivot point D7 form a second angle β. The second angle β is greater than 90° and less than 180°. By forming the second angle β with a large value, when the pedal apparatus 110 is in the extended state, the stepping load acting on the flipping arm 1115 can generate an outward component force in the second direction acting on the telescopic base 1112, thereby keeping the telescopic base 1112 in the extended state. Further, the second angle β can be greater than 92° and less than 98°.

Specifically, the size of the second angle β can be 91°, 91.5°, 92°, 93.5°, 95°, 100°, 105°, 110°, 120°, 130°, 140°, 150°, 155°, 160°, 165°, 170°, 171.5°, 173°, 174.5°, 176°, 177.5°, or 179°, etc. In this embodiment, the size of the second angle β is approximately 95°.

In this embodiment, the flipping arm 1115 is generally L-shaped. The flipping arm 1115 may include, but is not limited to, a connecting portion and a supporting portion that are connected. The end of the connecting portion away from the supporting portion is pivotally connected to the linkage assembly 1116 at the seventh pivot point D7, and the end of the connecting portion near the supporting portion is pivotally connected to the telescopic base 1112 at the fifth pivot point D5.

The linkage mechanism 111 provided by the present application comprises: a mounting base 1111 for being fixed to a vehicle 100; a telescopic base 1112, wherein, in a first direction, the telescopic base 1112 is located below the mounting base 1111; a first swing arm 1113, one end of the first swing arm 1113 is pivotally connected to the mounting base 1111 at a first pivot point D1, and the other end of the first swing arm 1113 is pivotally connected to the telescopic base 1112 at a second pivot point D2; a second swing arm 1114, one end of the second swing arm 1114 is pivotally connected to the mounting base 1111 at a third pivot point D3, and the other end of the second swing arm 1114 is pivotally connected to the telescopic base 1112 at a fourth pivot point D4; wherein, in a second direction, at least one of the first swing arm 1113 and the second swing arm 1114 is capable of driving the telescopic base 1112 to extend and retract relative to the mounting base 1111; a flipping arm 1115, the flipping arm 1115 is pivotally connected to the telescopic base 1112 at a fifth pivot point D5; at least one linkage assembly 1116, wherein, in a third direction, the linkage assembly 1116 is arranged on at least one of two sides of the telescopic base 1112, and the linkage assembly 1116 is pivotally connected to the flipping arm 1115 at a sixth pivot point D6; wherein the linkage assembly 1116 is capable of driving the flipping arm 1115 to pivot about the fifth pivot point D5 via the sixth pivot point D6. In the technical solution of the present application, during the process where the telescopic base 1112 extends relative to the mounting base 1111, as the flipping arm 1115 extends with the telescopic base 1112, the linkage assembly 1116 drives the flipping arm 1115 to flip outward, so that the pedal body 113 fixed to the flipping arm 1115 has a sufficient extension length; during the process where the telescopic base 1112 retracts relative to the mounting base 1111, as the flipping arm 1115 retracts with the telescopic base 1112, the linkage assembly 1116 drives the flipping arm 1115 to flip inward, so that the pedal body 113 fixed to the flipping arm 1115 can fit closely against the vehicle skirt; because the linkage assembly 1116 is arranged on at least one of the two sides of the telescopic base 1112, when the telescopic base 1112 is in the retracted state, the overall height H of the linkage mechanism 111 in the first direction can be designed to be smaller, thereby improving the passability and off-road performance of the vehicle 100. In this way, the linkage mechanism 111, while satisfying the functions of extension, retraction, and flipping, can increase the ground clearance of the chassis of the vehicle 100 in the retracted state, thereby improving the passability and off-road performance of the vehicle 100.

The foregoing descriptions are only partial embodiments of the present application and are not intended to limit the scope of protection of the present application. Any equivalent apparatus or equivalent process transformation made using the contents of the description and drawings of the present application, or directly or indirectly applied in other related technical fields, are all included within the patent protection scope of the present application.

The invention claimed is:

1. A linkage mechanism for use in a pedal apparatus, comprising:
   a mounting base, configured to be fixed to a vehicle;
   a retractable base, wherein, in a first direction, the retractable base is located below the mounting base;
   a first swing arm, wherein one end of the first swing arm is pivotally connected to the mounting base at a first pivot point, and another end of the first swing arm is pivotally connected to the retractable base at a second pivot point;

a second swing arm, wherein one end of the second swing arm is pivotally connected to the mounting base at a third pivot point, and another end of the second swing arm is pivotally connected to the retractable base at a fourth pivot point;

wherein, in a second direction, at least one of the first swing arm and the second swing arm is configured to drive the retractable base to extend and retract relative to the mounting base;

a flipping arm, wherein the flipping arm is pivotally connected to the retractable base at a fifth pivot point; and at least one linkage assembly, wherein, the at least one linkage assembly is in transmission connection with the second swing arm; and, in a third direction, the linkage assembly is arranged on at least one of two sides of the retractable base, and the linkage assembly is pivotally connected to the flipping arm at a sixth pivot point;

wherein the linkage assembly is configured to drive the flipping arm to pivot about the fifth pivot point via the sixth pivot point.

2. The linkage mechanism according to claim 1, wherein as the at least one of the first swing arm and the second swing arm drives the retractable base to extend or retract relative to the mounting base, the linkage assembly simultaneously drives the flipping arm to pivot about the fifth pivot point away from or towards the mounting base.

3. The linkage mechanism according to claim 1, wherein the linkage mechanism comprises two of the linkage assemblies, wherein, in the third direction, one of the linkage assemblies is arranged on one side of the retractable base, and the other linkage assembly is arranged on another side of the retractable base.

4. The linkage mechanism according to claim 1, wherein in the second direction, the fourth pivot point is located between the second pivot point and the fifth pivot point; in the second direction, the sixth pivot point is located closer to the second pivot point relative to the fifth pivot point; one end of the linkage assembly is pivotally connected to the mounting base at the third pivot point, and another end of the linkage assembly is pivotally connected to the flipping arm at the sixth pivot point.

5. The linkage mechanism according to claim 1, wherein the linkage assembly comprises a first link and a second link, one end of the first link is pivotally connected to one end of the second link at a seventh pivot point, another end of the first link is pivotally connected to the mounting base at an eighth pivot point, and another end of the second link is pivotally connected to the flipping arm at the sixth pivot point.

6. The linkage mechanism according to claim 5, wherein when the retractable base is in a retracted position and the flipping arm is at a first flipping limit position, a line connecting the eighth pivot point and the seventh pivot point and a line connecting the sixth pivot point and the seventh pivot point form a first angle; wherein the first angle is greater than or equal to 0° and less than 45°.

7. The linkage mechanism according to claim 6, wherein the first angle is greater than or equal to 21° and less than 27°.

8. The linkage mechanism according to claim 5, wherein when the retractable base is in an extended position and the flipping arm is at a second flipping limit position, a line connecting the eighth pivot point and the seventh pivot point and a line connecting the sixth pivot point and the seventh pivot point form a second angle; wherein the second angle is greater than 90° and less than 180°.

9. The linkage mechanism according to claim 8, wherein the second angle is greater than 92° and less than 98°.

10. The linkage mechanism according to claim 5, wherein the second swing arm is provided with a connecting shaft, and the second swing arm is fixedly connected to a structure between two ends of the first link via the connecting shaft.

11. The linkage mechanism according to claim 1, wherein under a drive of the linkage assembly, an angular range in which the flipping arm is configured to pivot about the fifth pivot point is greater than or equal to 45° and less than or equal to 70°.

12. The linkage mechanism according to claim 11, wherein the angular range in which the flipping arm is configured to pivot about the fifth pivot point is greater than or equal to 55° and less than or equal to 62°.

13. The linkage mechanism according to claim 1, wherein when the linkage mechanism is in a retracted state, an overall height of the linkage mechanism in the first direction is greater than 0 mm and less than 70 mm.

14. The linkage mechanism according to claim 13, wherein when the linkage mechanism is in the retracted state, the overall height of the linkage mechanism in the first direction is greater than 63 mm and less than 69 mm.

15. A pedal apparatus for use in a vehicle, comprising: at least one linkage mechanism, a drive unit, and a pedal body;

the drive unit is configured to drive the at least one linkage mechanism;

the pedal body is fixed to the at least one linkage mechanism; and under a drive of the drive unit, the pedal body is configured to extend, retract, and flip relative to the vehicle;

wherein the linkage mechanism, comprising:

a mounting base, configured to be fixed to a vehicle;

a retractable base, wherein, in a first direction, the retractable base is located below the mounting base;

a first swing arm, wherein one end of the first swing arm is pivotally connected to the mounting base at a first pivot point, and another end of the first swing arm is pivotally connected to the retractable base at a second pivot point;

a second swing arm, wherein one end of the second swing arm is pivotally connected to the mounting base at a third pivot point, and another end of the second swing arm is pivotally connected to the retractable base at a fourth pivot point;

wherein, in a second direction, at least one of the first swing arm and the second swing arm is configured to drive the retractable base to extend and retract relative to the mounting base;

a flipping arm, wherein the flipping arm is pivotally connected to the retractable base at a fifth pivot point; and at least one linkage assembly, wherein, the at least one linkage assembly is in transmission connection with the second swing arm; and, in a third direction, the linkage assembly is arranged on at least one of two sides of the retractable base, and the linkage assembly is pivotally connected to the flipping arm at a sixth pivot point;

wherein the linkage assembly is configured to drive the flipping arm to pivot about the fifth pivot point via the sixth pivot point.

16. The pedal apparatus according to claim 15, wherein the at least one linkage mechanism is arranged along a length of the pedal body, and wherein the drive unit is in a driving connection with one of the at least one linkage mechanism.

17. A vehicle, comprising a pedal apparatus, wherein the pedal apparatus comprises:

at least one linkage mechanism, a drive unit, and a pedal body;

the drive unit is configured to drive the at least one linkage mechanism;

the pedal body is fixed to the at least one linkage mechanism; and under a drive of the drive unit, the pedal body is configured to extend, retract, and flip relative to the vehicle;

wherein the linkage mechanism, comprising:

a mounting base, configured to be fixed to a vehicle;

a retractable base, wherein, in a first direction, the retractable base is located below the mounting base;

a first swing arm, wherein one end of the first swing arm is pivotally connected to the mounting base at a first pivot point, and another end of the first swing arm is pivotally connected to the retractable base at a second pivot point;

a second swing arm, wherein one end of the second swing arm is pivotally connected to the mounting base at a third pivot point, and another end of the second swing arm is pivotally connected to the retractable base at a fourth pivot point;

wherein, in a second direction, at least one of the first swing arm and the second swing arm is configured to drive the retractable base to extend and retract relative to the mounting base;

a flipping arm, wherein the flipping arm is pivotally connected to the retractable base at a fifth pivot point; and at least one linkage assembly, wherein, the at least one linkage assembly is in transmission connection with the second swing arm; and, in a third direction, the linkage assembly is arranged on at least one of two sides of the retractable base, and the linkage assembly is pivotally connected to the flipping arm at a sixth pivot point;

wherein the linkage assembly is configured to drive the flipping arm to pivot about the fifth pivot point via the sixth pivot point.

\* \* \* \* \*